US012569939B2

(12) United States Patent
Chiba et al.

(10) Patent No.: US 12,569,939 B2
(45) Date of Patent: Mar. 10, 2026

(54) PROCESSING SYSTEM, ROBOT SYSTEM, CONTROL DEVICE, TEACHING METHOD, AND STORAGE MEDIUM

(71) Applicant: KABUSHIKI KAISHA TOSHIBA, Tokyo (JP)

(72) Inventors: Yasunori Chiba, Yokohama (JP); Hiromasa Takahashi, Minato (JP); Masahiro Saito, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 203 days.

(21) Appl. No.: 17/812,560

(22) Filed: Jul. 14, 2022

(65) Prior Publication Data
US 2023/0020518 A1     Jan. 19, 2023

(30) Foreign Application Priority Data
Jul. 19, 2021     (JP) ................................. 2021-118985

(51) Int. Cl.
*B23K 31/12* (2006.01)
*B25J 9/16* (2006.01)

(52) U.S. Cl.
CPC ............. *B23K 31/125* (2013.01); *B25J 9/163* (2013.01); *B25J 9/1664* (2013.01); *B25J 9/1679* (2013.01); *B25J 9/1684* (2013.01)

(58) Field of Classification Search
CPC . G01N 29/00–52; B23K 31/125; B25J 9/163; B25J 9/1664; B25J 9/1679;
(Continued)

(56) References Cited

U.S. PATENT DOCUMENTS 10,152,034 B2 * 12/2018 Komatsu .............. G05B 19/406
2008/0210009 A1 9/2008 Tanishiki
(Continued)

FOREIGN PATENT DOCUMENTS

CN     101120248 A     2/2008
CN     104002297 A     8/2014
(Continued)

OTHER PUBLICATIONS

Office Action mailed Jan. 25, 2025 in Chinese Application No. 202210832063.8 filed Jul. 14, 2022 (w/English translation—citing documents Nos. 15-19 and 24).
(Continued)

*Primary Examiner* — Judy Nguyen
*Assistant Examiner* — James Split
(74) *Attorney, Agent, or Firm* — Oblon, McClelland, Maier & Neustadt, L.L.P.

(57) ABSTRACT

According to one embodiment, a processing system teaches an operation to a robot. The robot includes a detector including detection elements arranged along first and second directions, and a manipulator to which the detector is mounted. The processing system performs position teaching processing. The position teaching processing includes causing the detector to perform a probe of a weld portion of a joined body. The probe includes a transmission of an ultrasonic wave and a detection of a reflected wave. The position teaching processing includes calculating a center position of the weld portion in a first plane based on first intensity data of an intensity of the reflected wave, setting a teaching point of the robot based on a first position of the detector, and moving the detector along the first plane to a second position, and setting the teaching point based on the second position.

15 Claims, 16 Drawing Sheets

(58) Field of Classification Search
CPC ......... B25J 9/1684; G05B 2219/37206; G05B 2219/37217
See application file for complete search history.

(56) References Cited

U.S. PATENT DOCUMENTS

| | | | |
|---|---|---|---|
| 2016/0231291 A1* | 8/2016 | Boulware | G01N 29/24 |
| 2017/0284971 A1 | 10/2017 | Hall | |
| 2019/0160662 A1* | 5/2019 | Satou | B25J 9/163 |
| 2020/0003735 A1 | 1/2020 | Ushijima et al. | |
| 2020/0018727 A1 | 1/2020 | Ono et al. | |
| 2020/0363377 A1 | 11/2020 | Saito et al. | |

FOREIGN PATENT DOCUMENTS

| | | | | | |
|---|---|---|---|---|---|
| CN | 106716051 | A | 5/2017 | | |
| CN | 112129190 | A | 12/2020 | | |
| JP | 61-253506 | A | 11/1986 | | |
| JP | 2001-318715 | | 11/2001 | | |
| JP | 2006-153710 | A | 6/2006 | | |
| JP | 2007-278809 | A | 10/2007 | | |
| JP | 2018-202569 | | 12/2018 | | |
| JP | 6570600 | B2 | 9/2019 | | |
| JP | 2019-184620 | A | 10/2019 | | |
| JP | 2020-8452 | A | 1/2020 | | |
| JP | 2020-38218 | A | 3/2020 | | |
| JP | 6805289 | B2 | 12/2020 | | |
| WO | WO 2006/085570 | A1 | 8/2006 | | |
| WO | WO-2011039542 | A1 * | 4/2011 | ......... | G05B 19/423 |
| WO | WO 2016/172178 | A1 | 10/2016 | | |

OTHER PUBLICATIONS

Li Zhiqiang et al., "Design and Implementation of Teaching System for NC Arc—welding Robotic Positioner", Manufacturing technology and machine tools, 2004, Issue 8, pp. 60-63 (w/English machine translation).
Combined Chinese Notice of Allowance and Search Report issued Sep. 22, 2025 in Chinese Patent Application No. 202210832063.8 (with unedited computer-generated English Translation), citing reference 1 therein, 6 pages.

* cited by examiner

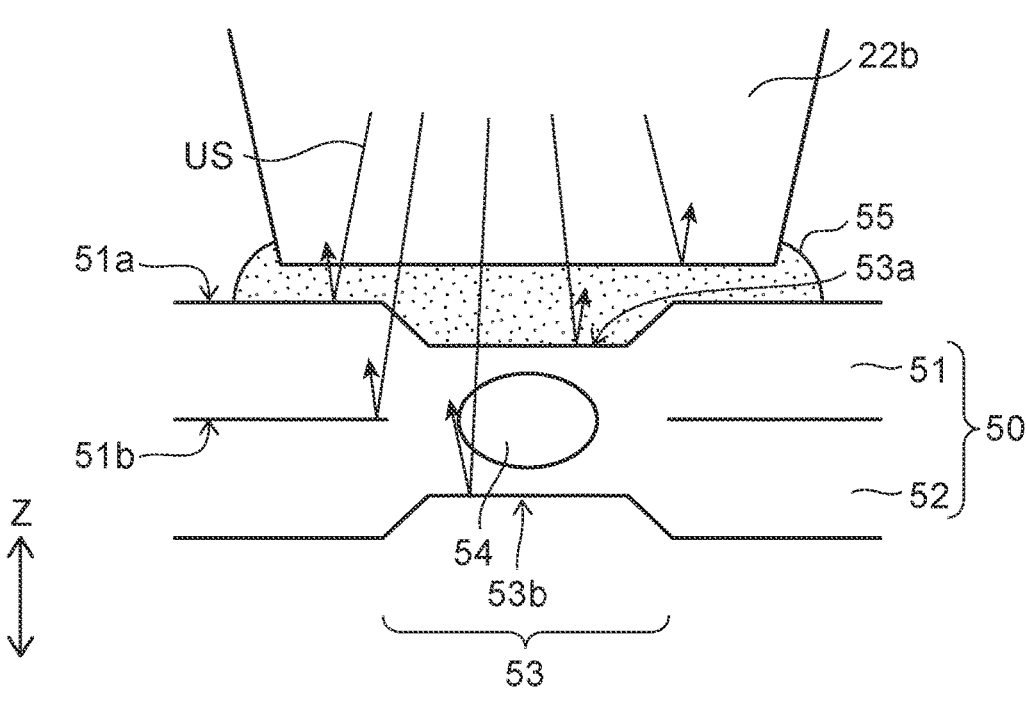
FIG. 3A
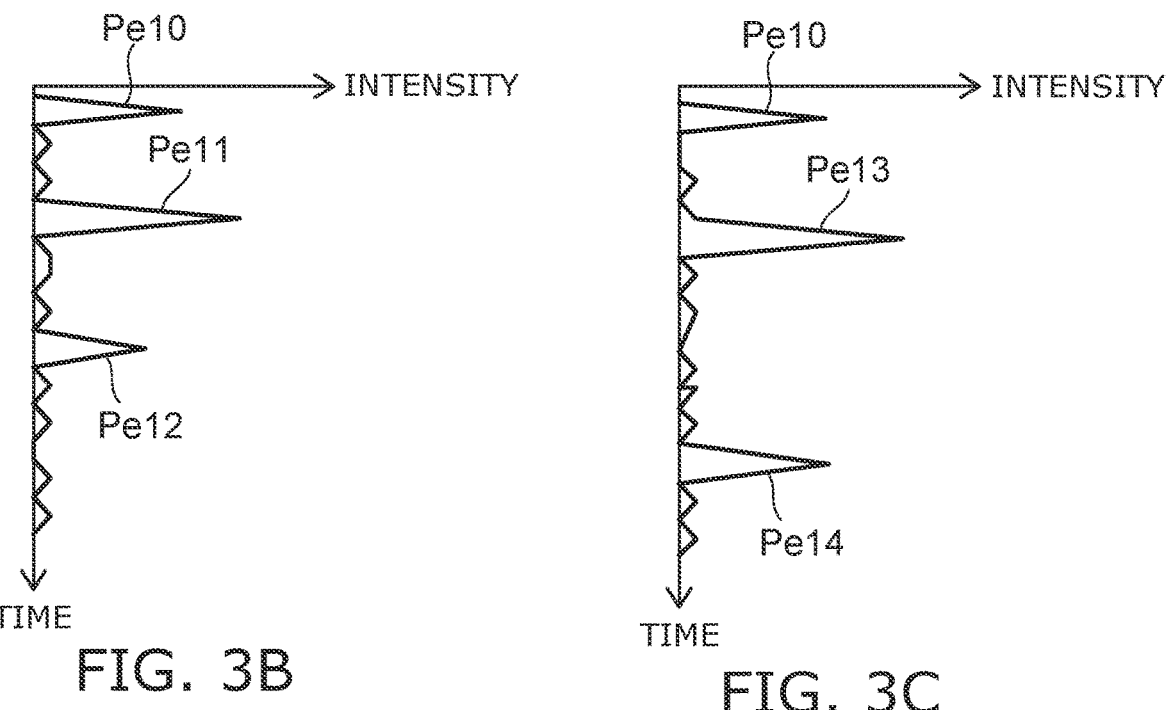
FIG. 3B
FIG. 3C

53

53

53

PROCESSING SYSTEM, ROBOT SYSTEM, CONTROL DEVICE, TEACHING METHOD, AND STORAGE MEDIUM

CROSS-REFERENCE TO RELATED APPLICATIONS

This application is based upon and claims the benefit of priority from Japanese Patent Application No. 2021-118985, filed on Jul. 19, 2021; the entire contents of which are incorporated herein by reference.

FIELD

Embodiments described herein relate generally to a processing system, a robot system, a control device, a teaching method, a program, and a storage medium.

BACKGROUND

There is a robot that inspects a joined body. There is a need for technology that can more easily set teaching points for such a robot when inspecting.

BRIEF DESCRIPTION OF THE DRAWINGS

FIGS. 3A to 3C are schematic views for describing operations of the processing system according to the embodiment;

DETAILED DESCRIPTION

Figure 1:
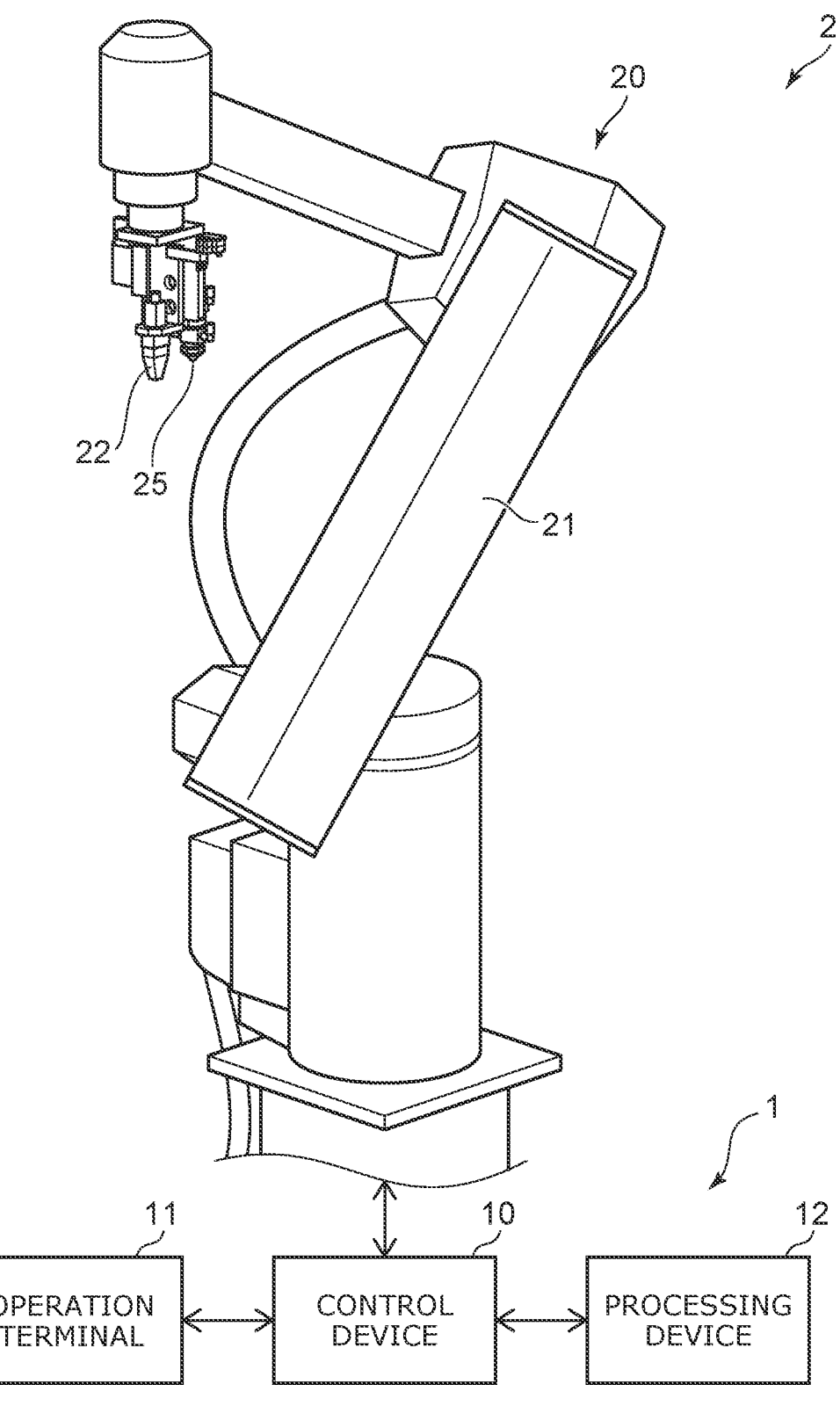
FIG. 1 is a schematic view showing a robot system according to an embodiment.

According to one embodiment, a processing system teaches an operation to a robot. The robot includes a detector including a plurality of detection elements arranged along a first direction and a second direction, and a manipulator to which the detector is mounted. The second direction crosses the first direction. The processing system performs position teaching processing. The position teaching processing includes causing the detector to perform a probe of a weld portion of a joined body. The probe includes a transmission of an ultrasonic wave and a detection of a reflected wave. The position teaching processing includes calculating a center position of the weld portion in a first plane based on first intensity data of an intensity of the reflected wave obtained by the probe. The first plane is along the first and second directions. The position teaching processing includes setting a teaching point of the robot based on a first position of the detector in the first plane when a distance between the center position and the first position is not more than a first threshold. When the distance is greater than the first threshold, the position teaching processing includes moving the detector along the first plane to a second position to reduce the distance, and setting the teaching point based on the second position.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

FIG. 1 is a schematic view showing a robot system according to an embodiment.

As shown in FIG. 1, the robot system 2 according to the embodiment includes a processing system 1 and a robot 20. The processing system 1 includes a control device 10, an operation terminal 11, and a processing device 12. The processing system 1 teaches an operation to the robot 20.

The control device 10 controls operations of the robot 20. The control device 10 is a so-called robot controller. The control device 10 includes a control circuit, a servo controller, a power supply device, etc. The control device 10 controls operations of the robot 20 by controlling servo motors of each axis according to a prestored operation program, teaching data set by the operation terminal 11, etc.

The operation terminal 11 is a terminal device for operating the robot 20. The operation terminal 11 is a so-called teaching pendant. The operation terminal 11 is connected with the control device 10 and accepts input of the operation program of the robot 20, input of settings, etc. For example, the control device 10 and the operation terminal 11 are connected via a wired cable, wireless communication, or a network. Also, the user uses the operation terminal 11 to modify, correct, or generate new teaching data, etc. Teaching data is data for teaching the operations of the robot 20 to the robot 20.

The robot 20 includes a manipulator 21, and a detector 22 mounted to the manipulator 21. For example, the manipulator 21 is vertical articulated. The detector 22 is located at the distal end of the manipulator 21 as an end effector. The manipulator 21 may be horizontal articulated or parallel link. The manipulator 21 may include a combination of two or more selected from vertical articulated, horizontal articulated, and parallel link. It is favorable for the manipulator 21 to have not less than six degrees of freedom.

The detector 22 performs a probe (probing) of the object. The probe includes transmitting an ultrasonic wave toward the object and detecting (receiving) a reflected wave. The detector 22 acquires intensity data of the intensity of the reflected wave by the probe. The detector 22 transmits the intensity data to the processing device 12 connected with the control device 10. For example, the control device 10 and the processing device 12 are connected via a wired cable, wireless communication, or a network.

In the example of FIG. 1, a dispenser 25 also is included as an end effector. The dispenser 25 dispenses a couplant liquid onto the surface of the object.

The object of the probe is a joined body joined by welding multiple members. The multiple members are joined at a weld portion. The processing device 12 processes intensity data and acquires data related to the weld portion. For example, the processing device 12 uses the intensity data to perform inspection processing of the weld portion. The robot system 2 performs the inspection processing for multiple joined bodies 50 of the same type.

Figure 2:
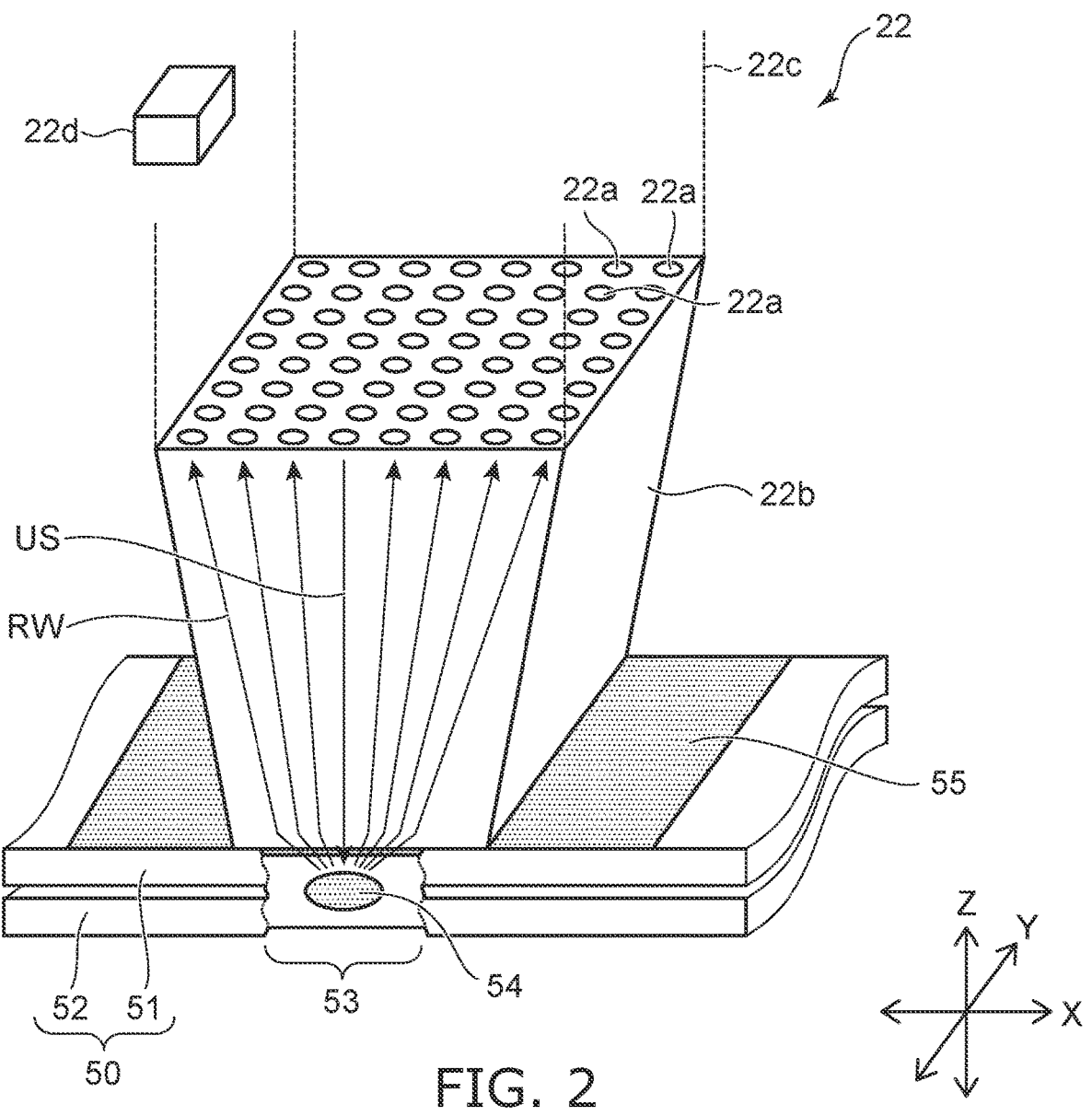
FIG. 2 is a schematic view showing the structure of the detector and the joined body.

FIG. 2 is a schematic view showing the structure of the detector and the joined body.

In the example of FIG. 2, the object of the probe by the detector 22 is the joined body 50. The joined body 50 includes a metal plate 51 (a first member) and a metal plate 52 (a second member). The metal plate 51 and the metal plate 52 are joined at a weld portion 53. In other words, a boundary between the metal plate 51 and the metal plate 52 does not exist at the weld portion 53. A solidified portion 54 that is formed by mixing the melted metal exists at the weld portion 53. The weld portion 53 is formed by resistance spot welding.

As shown in FIG. 2, the detector 22 includes detection elements 22a, a propagating part 22b, a housing 22c, and a sensor 22d.

The detection elements 22a are two-dimensionally arranged along an X-direction (a first direction) and a Y-direction (a second direction). The X-direction and the Y-direction cross each other. In the example, the Y-direction is perpendicular to the X-direction. For example, the detection element 22a is a transducer that emits an ultrasonic wave of a frequency of not less than 1 MHz and not more than 100 MHz. The detection element 22a transmits the ultrasonic wave along a Z-direction (a third direction). The Z-direction is perpendicular to the X-Y plane (a first plane).

The multiple detection elements 22a are located at the distal end of the housing 22c and are covered with the propagating part 22b. The propagating part 22b is positioned between the joined body 50 and the detection elements 22a when the detector 22 is caused to contact the joined body 50. When the detection element 22a emits an ultrasonic wave, the ultrasonic wave propagates through the propagating part 22b and is transmitted outside the detector 22. When the ultrasonic wave is reflected, the reflected wave propagates through the propagating part 22b and reaches the detection elements 22a.

The detection elements 22a detect the reflected wave. The intensity of the signal detected by the detection elements 22a corresponds to the intensity of the reflected wave. The detector 22 acquires signals (intensity data) indicating the reflected wave intensity and transmits the signals to the processing device 12.

The propagating part 22b includes a resin material or the like through which the ultrasonic wave easily propagates. Deformation, damage, and the like of the detection elements 22a can be suppressed by the propagating part 22b when the detector 22 contacts the weld portion 53. The propagating part 22b has a hardness sufficient to suppress the deformation, damage, and the like when contacting the weld portion 53.

The sensor 22d is mounted to the housing 22c and detects contact of the detector 22 on the joined body 50. The sensor 22d is, for example, a force sensor, an acceleration sensor, an angular velocity sensor, a photointerrupter sensor, or a distance sensor.

A couplant liquid 55 is coated onto the surface of the joined body 50 so that the ultrasonic wave easily propagates between the detector 22 and the joined body 50 when probing. Each detection element 22a transmits an ultrasonic wave US toward the joined body 50 on which the couplant liquid 55 is coated.

For example, as shown in FIG. 2, one detection element 22a transmits the ultrasonic wave US toward the joined body 50. A portion of the ultrasonic wave US is reflected by the upper surface, lower surface, or the like of the joined body 50. The multiple detection elements 22a each detect a reflected wave RW. In the probe, each detection element 22a sequentially transmits the ultrasonic wave US; and each reflected wave RW is detected by the multiple detection elements 22a.

The processing device 12 uses the intensity data to perform various processing. For example, the processing device 12 inspects the weld portion 53. The processing device 12 may identify the position of the weld portion 53 in the joined body 50. The processing device 12 may calculate the center position of the weld portion 53. The processing device 12 may calculate the diameter of the weld portion 53.

FIGS. 3A to 3C are schematic views for describing operations of the processing system according to the embodiment.

As shown in FIG. 3A, the ultrasonic wave US is reflected by the surface of the propagating part 22b, an upper surface 51a and a lower surface 51b of the metal plate 51, and an upper surface 53a and a lower surface 53b of the weld portion 53.

The Z-direction positions of the surface of the propagating part 22b, the upper surface 51a, the upper surface 53a, the lower surface 51b, and the lower surface 53b are different from each other. In other words, distances in the Z-direction between the detection element 22a and these surfaces are different from each other. The detection element 22a detects peaks of the reflected wave intensities when detecting the reflected waves from these surfaces. Which surface reflected the ultrasonic wave US can be discriminated by calculating the time until each peak is detected after transmitting the ultrasonic wave US.

FIGS. 3B and 3C are graphs illustrating the relationship between the time after transmitting the ultrasonic wave US and the intensity of the reflected wave RW at one point in the X-Y plane. In FIGS. 3B and 3C, the horizontal axis is the intensity of the detected reflected wave RW. The vertical axis is the elapsed time after transmitting the ultrasonic wave US. The time corresponds to the Z-direction position. The graph of FIG. 3B illustrates a detection result of the reflected waves RW from the surface of the propagating part 22b, the upper surface 51a, and the lower surface 51b. In other words, the graph of FIG. 3B illustrates the detection result of the reflected waves RW from a point that is not joined. The graph of FIG. 3C illustrates the detection result of the reflected waves RW from the surface of the propagating part 22b, the upper surface 53a, and the lower surface 53b. In other words, the graph of FIG. 3C illustrates the detection result of the reflected waves RW from a point that is joined.

In the graphs of FIGS. 3B and 3C, a peak Pe10 is based on the reflected wave RW from the surface of the propagating part 22b. A peak Pe11 is based on the reflected wave RW from the upper surface 51a. A peak Pe12 is based on the reflected wave RW from the lower surface 51b. Times from the transmission of the ultrasonic wave US until the peak Pe11 and the peak Pe12 are detected correspond respectively to the Z-direction positions of the upper surface 51a and the lower surface 51b.

Similarly, a peak Pe13 is based on the reflected wave RW from the upper surface 53a. A peak Pe14 is based on the reflected wave RW from the lower surface 53b. The times from the transmission of the ultrasonic wave US until the peak Pe13 and the peak Pe14 are detected correspond respectively to the Z-direction positions of the upper surface 53a and the lower surface 53b.

The processing device 12 determines whether or not the peak Pe12 exists in the Z-direction reflected wave intensity distribution at points in the X-Y plane. Specifically, the processing device 12 detects a peak in a range in the Z-direction in which the peak Pe12 may be detected. The processing device 12 compares the peak intensity to a threshold. The threshold and the range in the Z-direction are preset.

When the peak intensity is greater than the threshold, the processing device 12 determines that the peak is the peak Pe12. The existence of the peak Pe12 indicates that the lower surface 51b exists at the point and that the metal plate 51 and the metal plate 52 are not joined. The processing device 12 determines that points at which the peak Pe12 is detected are not joined. The processing device 12 determines that points at which the peak Pe12 is not detected are joined. The processing device 12 sequentially determines whether or not each of multiple points in the X-Y plane are joined. The processing device 12 identifies a cluster of points determined to be joined as the weld portion 53.

For example, in the inspection processing, the processing device 12 identifies the weld portion 53 and calculates the diameter of the weld portion 53. The processing device 12 compares the diameter to a preset threshold. The processing device 12 determines the weld portion 53 to pass when the diameter is greater than the threshold. The processing device 12 determines the weld portion 53 to fail when the diameter is not more than the threshold. The diameter that is compared to the threshold is the major diameter or the minor diameter of the weld portion 53.

In the examples of FIGS. 3B and 3C, the intensity of the reflected wave RW is expressed as an absolute value. The intensity of the reflected wave may be expressed in any form. For example, the reflected wave intensity that is output from the detection element 22a includes positive values and negative values according to the phase. Various processing may be performed based on the reflected wave intensity including positive values and negative values. The reflected wave intensity that includes positive values and negative values may be converted into absolute values. The average value of the reflected wave intensities may be subtracted from the reflected wave intensity at each time. Or, the weighted average value, the weighted moving average value, etc., of the reflected wave intensities may be subtracted from the reflected wave intensity at each time. Filtering may be performed to extract only a frequency component of a specific period. The various processing described in the application can be performed even when the results of such processing applied to the reflected wave intensity are used.

Figure 4:
FIG. 4 is a schematic view illustrating intensity data obtained by the probe.
Figure 4:
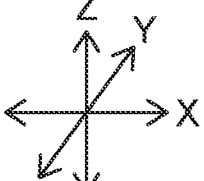

FIG. 4 is a schematic view illustrating intensity data obtained by the probe.

In the probe as described above, each detection element 22a sequentially transmits an ultrasonic wave; and each reflected wave is detected by the multiple detection elements 22a. In the specific example shown in FIG. 2, 8×8, i.e., sixty-four detection elements 22a are provided. In such a case, the sixty-four detection elements 22a sequentially transmit ultrasonic waves. One detection element 22a repeatedly detects the reflected wave 64 times. The detection result of the Z-direction reflected wave intensity distribution is output 64 times from one detection element 22a. The intensity distribution of the sixty-four reflected waves output from the one detection element 22a are summed. The summed intensity distribution is used as the intensity distribution at the coordinate at which the one detection element 22a is located in one probe. Similar processing is performed for the detection results of the sixty-four detection elements 22a. Aperture synthesis may be performed to increase the resolution in the X-direction and the Y-direction of the detection results of the detection elements 22a. The reflected wave intensity distribution in the Z-direction is generated at each of multiple points in the X-Y plane (the first plane) by the processing described above. In other words, three-dimensional intensity data that includes the reflected wave intensity at points in the X-direction, the Y-direction, and the Z-direction is obtained.

FIG. 4 schematically shows a three-dimensional intensity distribution. The schematic view of FIG. 4 shows the weld portion 53 vicinity of the three-dimensional intensity data. In FIG. 4, portions at which the luminance is high are portions at which the reflected wave intensity of the ultrasonic wave is relatively large. In the example of FIG. 4, reflected waves from the upper surface and the lower surface of the weld portion 53 and reflected waves of multiple reflections between the upper surface and the lower surface appear.

When obtaining data related to the weld portion in the inspection processing, the control device 10 operates the manipulator 21 so that the distal end of the detector 22 contacts the weld portion 53. When performing the probe in the inspection processing, the orientation and the position of the distal end of the detector 22 are preset as a teaching point. The position and orientation of another portion corresponding to the position and orientation of the distal end of the detector 22 may be set as the teaching point. In such a case as well, the position and orientation of the distal end of the detector 22 can be considered to be set as the teaching point.

The control device 10 operates the manipulator 21 according to an operation program to set the position and orientation of the distal end of the detector 22 to the position and orientation of the teaching point. Specifically, the control device 10 acquires data of the rotation angles of the actuators from encoders included at the joints of the manipulator 21. The control device 10 generates a control signal based on the stored teaching point and the acquired data. The control device 10 transmits the generated control signal to the robot 20 and moves the manipulator 21 by operating the actuators.

The processing system 1 according to the embodiment teaches an operation to the robot 20. The processing system 1 can be utilized to set the teaching point of the robot 20. The processing system 1 sets the teaching point by using the intensity data transmitted from the detector 22.

Figure 5:
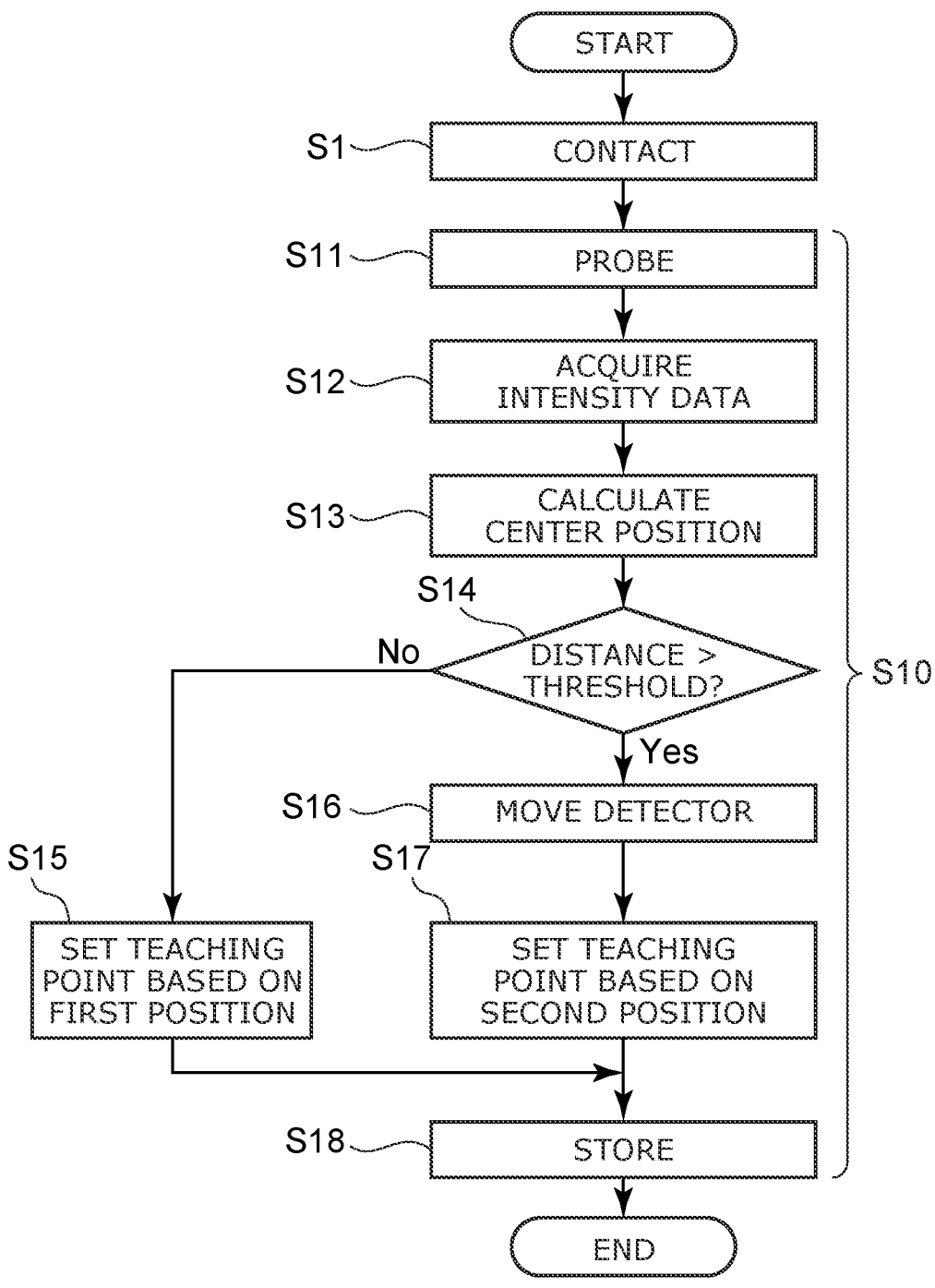
FIG. 5 is a flowchart showing a teaching method according to the embodiment.

FIG. 5 is a flowchart showing a teaching method according to the embodiment.

The user causes the distal end of the detector 22 to approach the weld portion 53. A couplant liquid is coated onto the weld portion 53. The detector 22 contacts the weld portion 53 (step S1). For example, the user moves the manipulator 21 by hand or by the operation terminal 11 and causes the distal end of the detector 22 to contact the weld portion 53. Or, after the user causes the detector 22 to approach the weld portion 53, the control device 10 may cause the detector 22 to contact the weld portion 53 by moving the manipulator 21. The processing system 1 performs position teaching processing (step S10).

In the position teaching processing, the processing device 12 causes the detector 22 to perform a probe in a state in which the detector 22 contacts the weld portion 53 (step S11). The detector 22 acquires intensity data (first intensity data) of the intensity of the reflected wave by the probe (step S12). The processing device 12 receives the intensity data from the detector 22. The processing device 12 calculates the center position of the weld portion 53 in the X-Y plane based on the intensity data (step S13). The processing device 12 transmits the center position to the control device 10. The control device 10 refers to the position (a first position) in the X-Y plane of the detector 22. The control device 10 compares the distance between the first position and the received center position to a preset threshold (a first threshold) (step S14).

For example, the position in the X-Y plane of the detector 22 corresponds to the center position in the X-Y plane of the intensity data. In such a case, the center position of the weld portion 53 calculated based on the intensity data corresponds to the distance between the center position of the weld portion 53 and the center position in the X-Y plane of the intensity data. Therefore, in step S14, the control device 10 compares the received center position of the weld portion 53 to the preset threshold (the first threshold).

When the distance is not more than the threshold, the control device 10 sets a teaching point based on the first position (step S15). For example, the control device 10 sets the first position as the position of the teaching point. The control device 10 may set a position obtained by a calculation performed on the first position as the position of the teaching point.

When the distance is greater than the threshold, the control device 10 moves the detector 22 along the X-Y plane to reduce the distance (step S16). At this time, the control device 10 may move the detector 22 away from the joined body 50 to avoid friction between the detector 22 and the joined body 50. After moving the detector 22 away from the joined body 50, the control device 10 moves the detector 22 along the X-Y plane. Subsequently, the control device 10 causes the detector 22 to contact the joined body 50.

The control device 10 refers to the position (a second position) in the X-Y plane of the detector 22 after moving. The control device 10 sets the teaching point based on the second position (step S17). For example, the control device 10 sets the second position as the position of the teaching point. The control device 10 may set a position obtained by a calculation performed on the second position as the position of the teaching point.

The control device 10 may re-perform step S14 after step S16. In such a case, the distance between the center position and the position of the detector 22 is re-compared to the threshold. Step S16 is repeated until the distance equals the threshold or less. The position of the teaching point can be set more appropriately thereby. The control device 10 stores the set teaching point (step S18).

The XYZ coordinate system shown in FIG. 2 may be different from the robot coordinate system used to express the teaching point. The control device 10 or the processing device 12 may convert the center position calculated in step S13 into the robot coordinate system as appropriate. When setting the teaching point, the control device 10 or the processing device 12 may convert the position in the X-Y plane of the detector 22 into the robot coordinate system as appropriate.

The method for calculating the center position of the weld portion 53 in the teaching method described above will now be described. The center position can be calculated using any of the following methods.

Figures 6A, 6B, 6C:
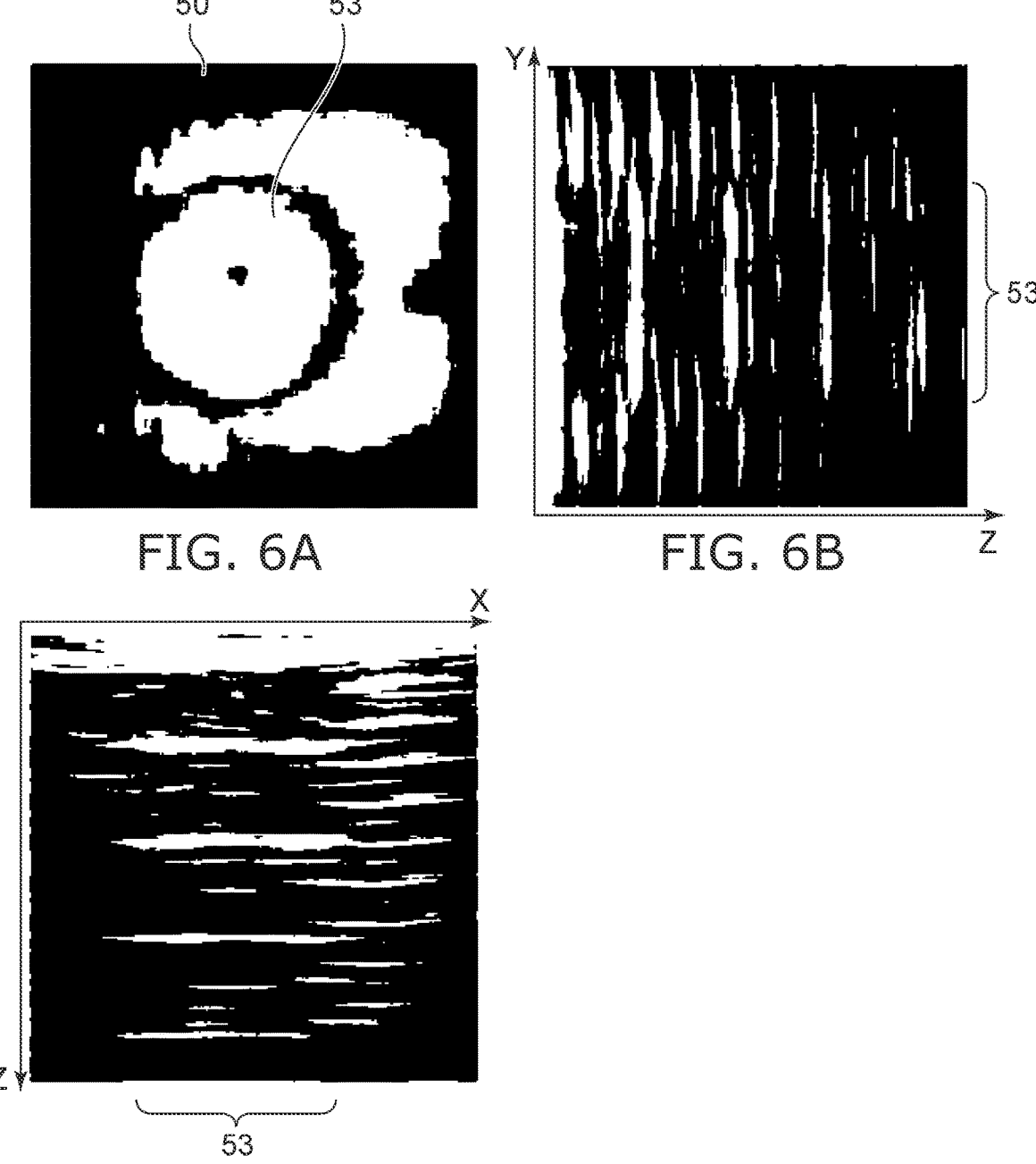
FIGS. 6A to 6C are schematic views showing a reflected wave intensity distribution obtained by processing the intensity data.

FIGS. 6A to 6C are schematic views showing a reflected wave intensity distribution obtained by processing the intensity data.

The processing device 12 acquires the data shown in FIGS. 6A to 6C by processing the intensity data. FIG. 6A shows the reflected wave intensity distribution in the X-Y plane at the weld portion 53 vicinity. FIG. 6B shows the reflected wave intensity distribution in the Y-Z plane at the weld portion 53 vicinity. FIG. 6C shows the reflected wave intensity distribution in the X-Z plane at the weld portion 53 vicinity.

The data of FIG. 6A is obtained by summing the intensity in the Z-direction at each point in the X-Y plane. The data of FIG. 6B is obtained by summing the intensity in the X-direction at each point in the Z-direction. The data of FIG. 6C is obtained by summing the intensity in the Y-direction at each point in the Z-direction. FIGS. 6A to 6C show schematically binarized intensities of the reflected waves. The white points indicate that the intensity of the reflected wave is relatively high at those points. The black points indicate that the intensity of the reflected wave is relatively low at those points.

For example, the processing device 12 calculates the centroid position of the intensity as the center position of the weld portion 53 for the reflected wave intensity distribution in the X-Y plane shown in FIG. 6A. For example, as shown in FIG. 6A, the luminous centroid position of the binarized image may be calculated. Or, the luminous centroid position may be calculated for an image in which each pixel has a pixel value of one of three or more levels (e.g., 0 to 255).

Or, the processing device 12 may calculate the centroid position by extracting the reflected wave component from the weld portion 53 in the Z-direction. For example, as shown in FIGS. 6B and 6C, the period at which the reflected wave from the weld portion 53 is detected is different from the period at which the reflected waves from other portions are detected. The processing device 12 filters the intensity distribution in the Z-direction by using a preset thickness of the weld portion 53. Thereby, the processing device 12 extracts the reflected wave component from the weld portion 53. The processing device 12 calculates the centroid position of the intensity distribution in the X-Y plane after filtering as the center position of the weld portion 53.

Or, the processing device 12 may identify the weld portion 53 and calculate the center position based on the identified weld portion 53.

Figure 7:
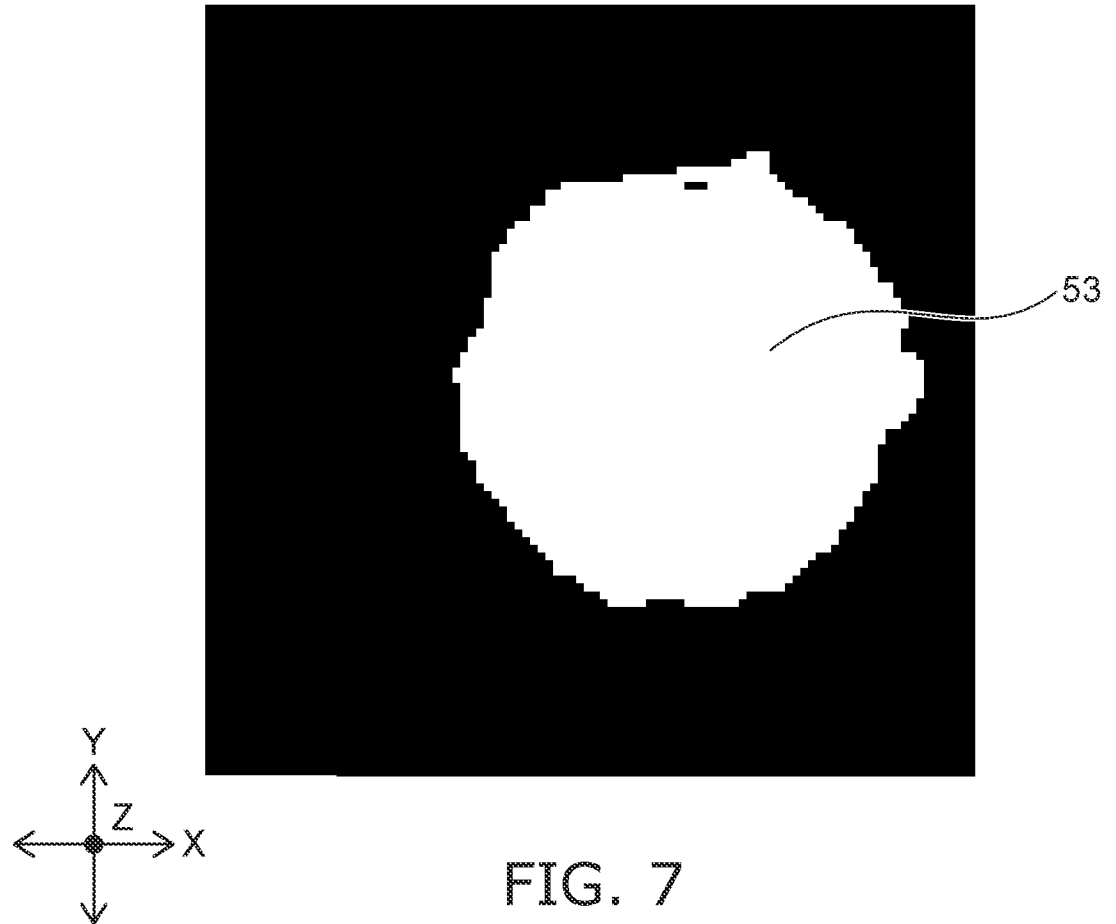
FIG. 7 is a schematic view illustrating the identified weld portion.

FIG. 7 is a schematic view illustrating the identified weld portion.

FIG. 7 shows the result of determining a joint or non-joint at each of multiple points in the X-Y plane in which the probe is performed. The ranges in the X-direction and the Y-direction of the region in which the determination of the joint or non-joint is performed correspond to the range in the X-direction and the Y-direction in which the intensity data is obtained. As an example, the range in the X-direction and the range in the Y-direction of the two-dimensional data shown in FIG. 7 correspond respectively to the range in the X-direction and the range in the Y-direction of the three-dimensional intensity data shown in FIG. 4. A portion of the range in the X-direction and the Y-direction in which the intensity data is obtained may be extracted, and the determination of the joint or non-joint may be performed for the extracted region. In FIG. 7, the points that are determined to be joined based on the intensity data are illustrated using white. The points that are determined not to be joined are illustrated using black. A cluster of points determined to be joined is identified as the weld portion 53. The processing device 12 uses the determination result of the joining at the points to generate the two-dimensional data shown in FIG. 7.

The processing device 12 may calculate the centroid position in the X-Y plane of the identified weld portion 53 as the center position of the weld portion 53. As described above, the weld portion 53 can be identified by determining the joint or non-joint at each point in the X-Y plane. The processing device 12 may calculate the center of a circle that inscribes or circumscribes the identified weld portion 53 in the X-Y plane as the center position of the weld portion 53.

When the teaching point has been set, thereafter, the robot system 2 uses the teaching point to perform the inspection processing. For example, the robot system 2 refers to the teaching point and performs the inspection processing for the weld portion 53 of another joined body 50. When performing the inspection processing, the control device 10 moves the manipulator 21 and sets the position and orientation of the distal end of the detector 22 to the position and orientation of the teaching point.

When multiple weld portions 53 are formed in one joined body 50, the teaching point is set for each weld portion 53. After the multiple teaching points are set, the inspection processing is performed for the multiple weld portions 53 of another joined body 50.

Advantages of the embodiment will now be described.

To automatically inspect the joined body 50 by using the manipulator 21, it is necessary to pre-teach the position and orientation of the detector 22 when inspecting. The taught operation is performed by a teaching playback method. The following is a teaching method according to a reference example. The user of the robot 20 prepares the joined body 50. The user checks the weld portion 53 of the joined body 50 with the naked eye. The user moves the manipulator 21 by hand or by the operation terminal 11 and causes the distal end of the detector 22 to contact the center of the weld portion 53. The control device 10 sets the position and orientation of the distal end of the detector 22 at this time as a teaching point.

To cause the distal end of the detector 22 to contact the center of the weld portion 53, it is necessary to finely adjust the position of the detector 22. A long period of time is necessary to set the teaching point when the user is inexperienced at the task. Also, fluctuation occurs in the taught position. When teaching, there is also a possibility that the detector 22 may be damaged by contact of the detector 22 with the joined body 50. Also, a weld mark exists at the position at which the weld portion 53 is formed. The user considers the center of the weld mark to be the center of the weld portion 53 and causes the detector 22 to contact the center of the weld mark. However, there are cases where the center of the weld mark deviates from the actual center of the weld portion 53. When the position of the detector 22 deviates from the center of the weld portion 53, the accuracy of the inspection may decrease. Therefore, technology that can more easily set the center of the weld portion 53 as the teaching point is desirable.

For this problem, in the processing system 1 according to the embodiment, position teaching processing is performed. In the position teaching processing, it is automatically determined whether or not the position of the detector 22 deviates from the center position of the weld portion 53 based on the intensity data obtained by the probe. When the position of the detector 22 deviates from the center position of the weld portion 53, the processing system 1 controls the manipulator 21 so that the detector 22 approaches the center position of the weld portion 53. It is therefore unnecessary for the user to adjust the position of the detector 22. The fluctuation of the taught position also can be suppressed. Damage of the detector 22 when teaching can be suppressed. Also, the position of the detector 22 can be aligned with the center position of a weld portion 53 that cannot be checked by the naked eye of the user. According to the embodiment, the center position of the weld portion 53 can be more easily set as the teaching point.

First Modification

Figure 8:
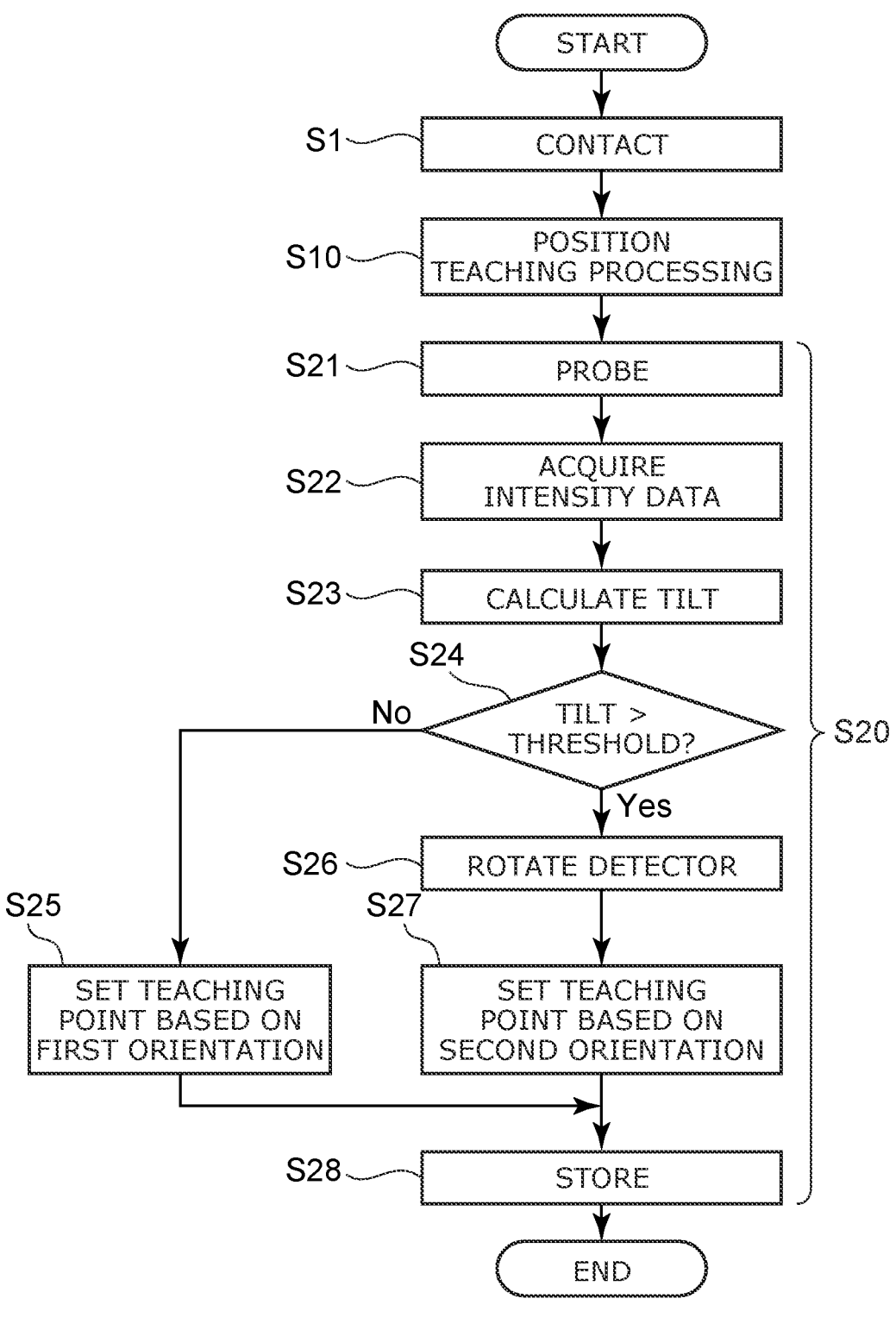
FIG. 8 is a flowchart showing a teaching method according to a first modification of the embodiment.

FIG. 8 is a flowchart showing a teaching method according to a first modification of the embodiment.

The orientation of the detector 22 affects the intensity data obtained by the probe. It is favorable for the orientation of the detector 22 to be perpendicular to the surface of the weld portion 53. As shown in FIG. 8, the processing system 1 may perform orientation teaching processing (step S20) in addition to the position teaching processing (step S10).

In the orientation teaching processing, the processing device 12 causes the detector 22 to perform the probe in a state in which the detector 22 contacts the weld portion (step S21). The detector 22 acquires intensity data (second intensity data) of the intensity of the reflected wave by the probe (step S22). Based on the intensity data, the processing device 12 calculates how much the orientation (a first orientation) of the detector 22 when probing is tilted with respect to the weld portion 53 (step S23). The processing device 12 transmits the calculated tilt to the control device 10. The control device 10 compares the tilt to a preset threshold (a second threshold) (step S24).

When the tilt is not more than the threshold, the control device 10 sets the orientation of the teaching point based on the first orientation (step S25). For example, the control device 10 sets the first orientation as the orientation of the teaching point. The control device 10 may set an orientation obtained by a calculation performed on the first orientation as the orientation of the teaching point.

When the tilt is greater than the threshold, the control device 10 rotates the detector 22 around the X-direction or the Y-direction to reduce the tilt (step S26). For example, the distal end of the detector 22 is set to the rotation center. The control device 10 refers to the orientation (the second orientation) of the detector 22 after rotating. The control device 10 sets the orientation of the teaching point based on the second orientation (step S27). For example, the control device 10 sets the second orientation as the orientation of the teaching point. The control device 10 may set an orientation obtained by a calculation performed on the second orientation as the orientation of the teaching point.

The control device 10 may re-perform step S24 after step S26. In such a case, the tilt is re-compared to the threshold. Step S26 is repeated until the tilt becomes the threshold or less. The orientation of the teaching point can be set more appropriately thereby. The control device 10 stores the teaching point that is set (step S28).

Figure 9:
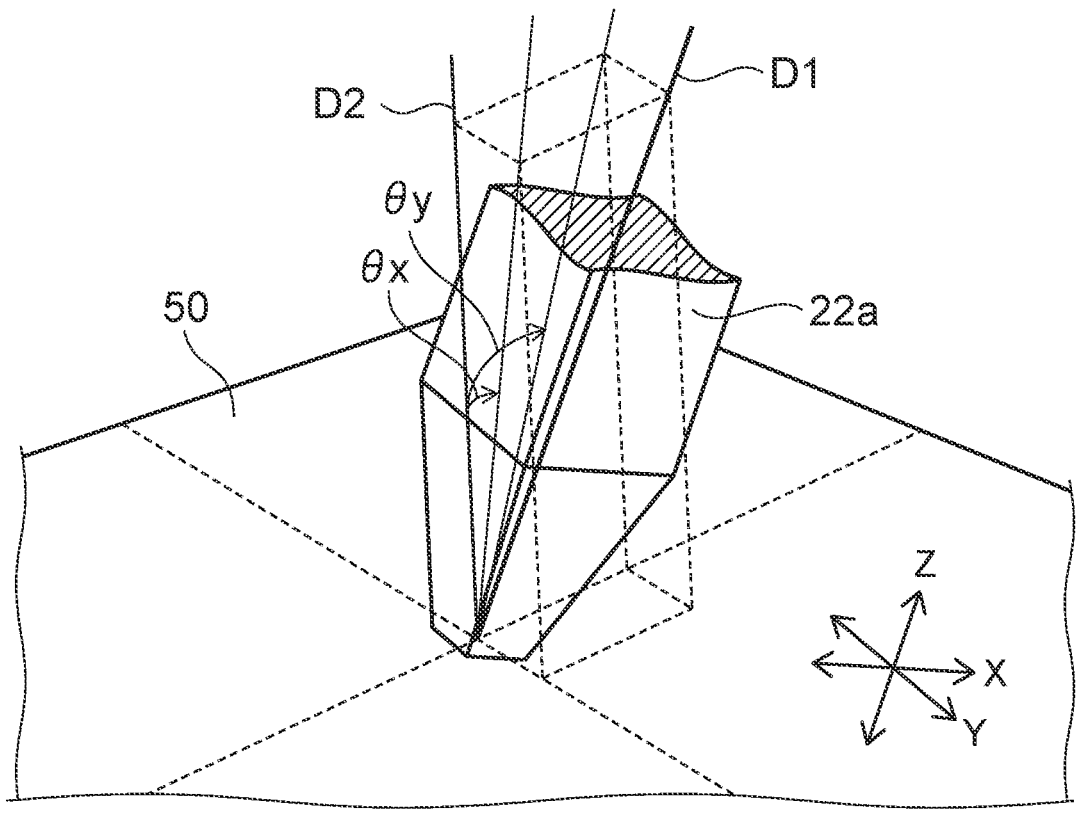
FIG. 9 is a schematic view showing the detector.

FIG. 9 is a schematic view showing the detector.

For example, the orientation corresponds to a direction D1 of the detector 22 shown in FIG. 9. The direction D1 is perpendicular to the arrangement directions of the multiple detection elements 22a. The tilt is represented by an angle $\theta x$ around the X-direction and an angle $\theta y$ around the Y-direction between the direction D1 of the detector 22 and a normal direction D2 of the weld portion 53.

The angle that represents the orientation shown in FIG. 8 may be different from an angle in the robot coordinate system used to express the teaching point. The control device 10 or the processing device 12 may convert the tilt calculated in step S23 into the robot coordinate system as appropriate. When setting the teaching point, the control device 10 or the processing device 12 may convert the angle representing the orientation of the detector 22 into an angle in the robot coordinate system as appropriate.

Figure 10A:
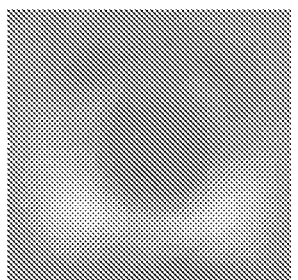
FIGS. 10A to 10C are examples of images obtained in the inspection.
Figures 10B, 10C:
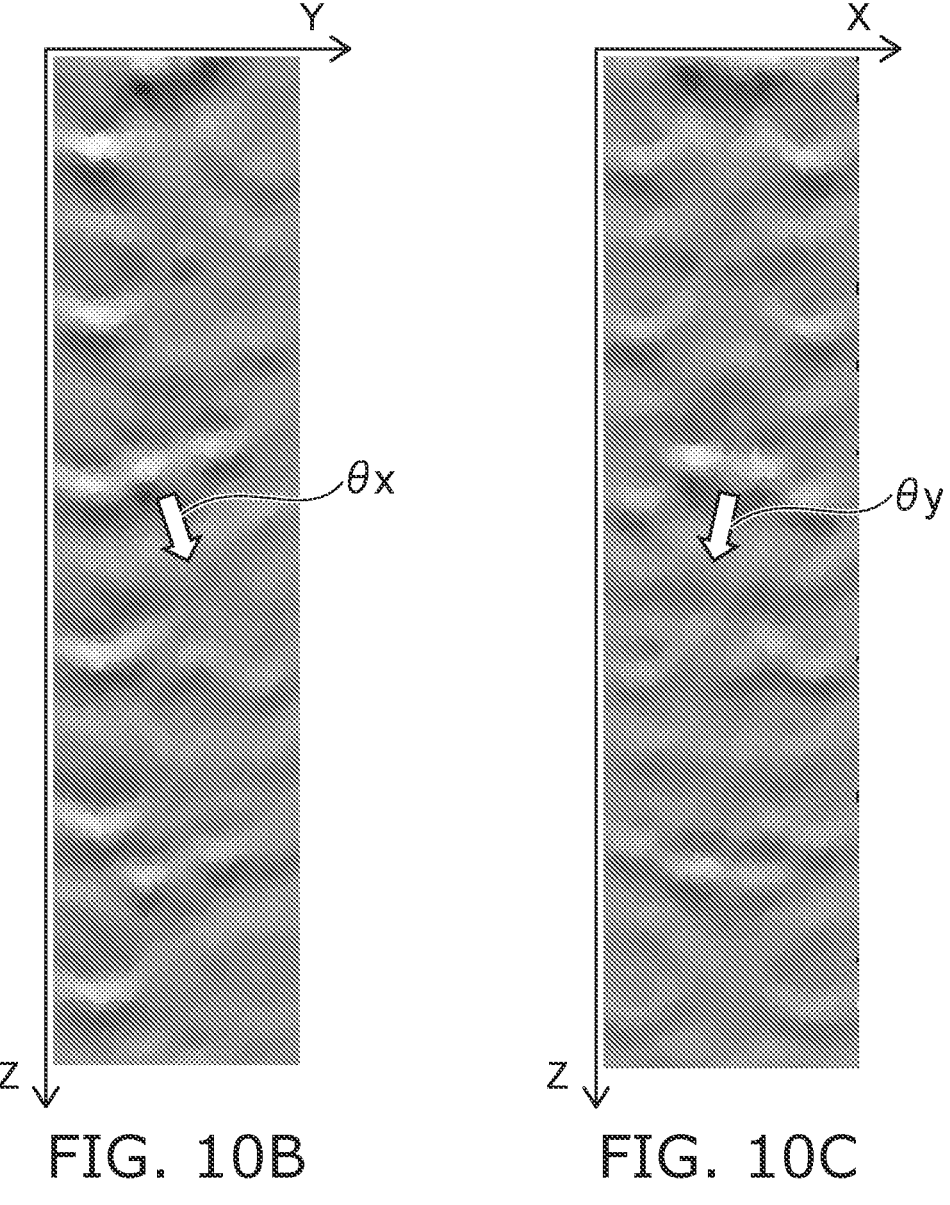

FIGS. 10A to 10C are examples of images obtained in the inspection.

A method for calculating the tilt will now be described. FIG. 10A is an image of the reflected wave intensity distribution in the X-Y plane at the weld portion 53 vicinity. FIG. 10B is an image of the reflected wave intensity distribution in the Y-Z plane at the weld portion 53 vicinity. FIG. 10C is an image of the reflected wave intensity distribution in the X-Z plane at the weld portion 53 vicinity. In the images of FIGS. 10A to 10C, the luminance corresponds to the intensity of the reflected wave. In other words, a brighter pixel color indicates that the reflected wave intensity is high at that point.

As shown in FIG. 10B, the angle $\theta x$ is calculated based on the detection result in the Y-Z plane. As shown in FIG. 10C, the angle $\theta y$ is calculated based on the detection result in the X-Z plane. Specifically, the processing device 12 calculates the average of the three-dimensional luminance gradients. The processing device 12 uses the average of the gradients around the X-direction as the angle $\theta x$. The processing device 12 uses the average of the gradients around the Y-direction as the angle $\theta y$.

The orientation teaching processing may be performed before the position teaching processing or may be performed after the position teaching processing. The position teaching processing and the orientation teaching processing may be performed based on the result of one probe.

Figures 11A, 11B:
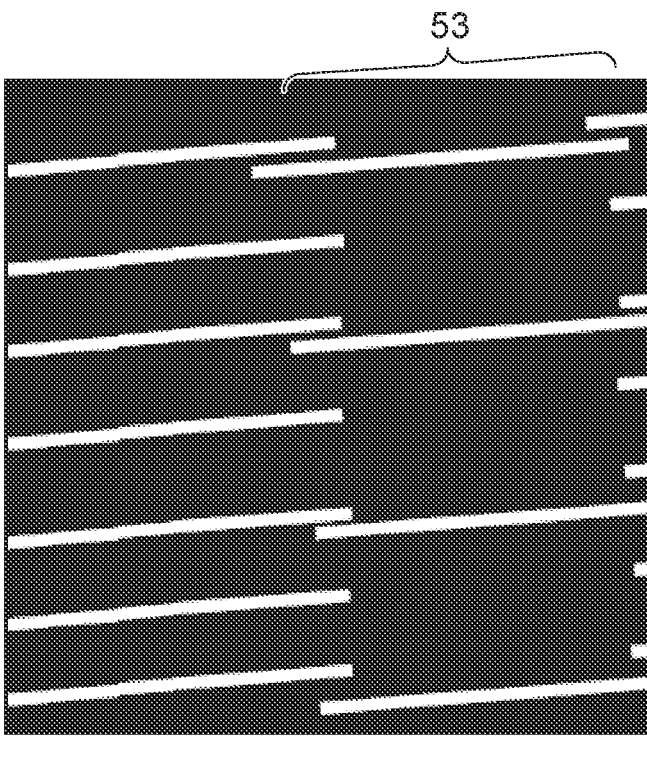
FIGS. 11A and 11B are schematic views showing reflected wave intensity distributions.

FIGS. 11A and 11B are schematic views showing reflected wave intensity distributions.

Favorably, the orientation teaching processing is performed after the position teaching processing. When the center position of the weld portion 53 deviates from the position of the detector 22 and the detector 22 is tilted with respect to the weld portion 53, there is a possibility that multiple-reflection waves from the weld portion 53 may be undetected by the detector 22 as shown in FIG. 11A. Multiple-reflection waves are reflected waves detected at deep Z-direction positions. When multiple-reflection waves are not detected, the accuracy of the calculated orientation of the detector 22 may decrease. By performing the position teaching processing before the orientation teaching processing, the multiple-reflection waves from the weld portion 53 are more easily detected as shown in FIG. 11B. Thereby, the orientation of the detector 22 can be calculated with higher accuracy.

Second Modification

Figure 12:
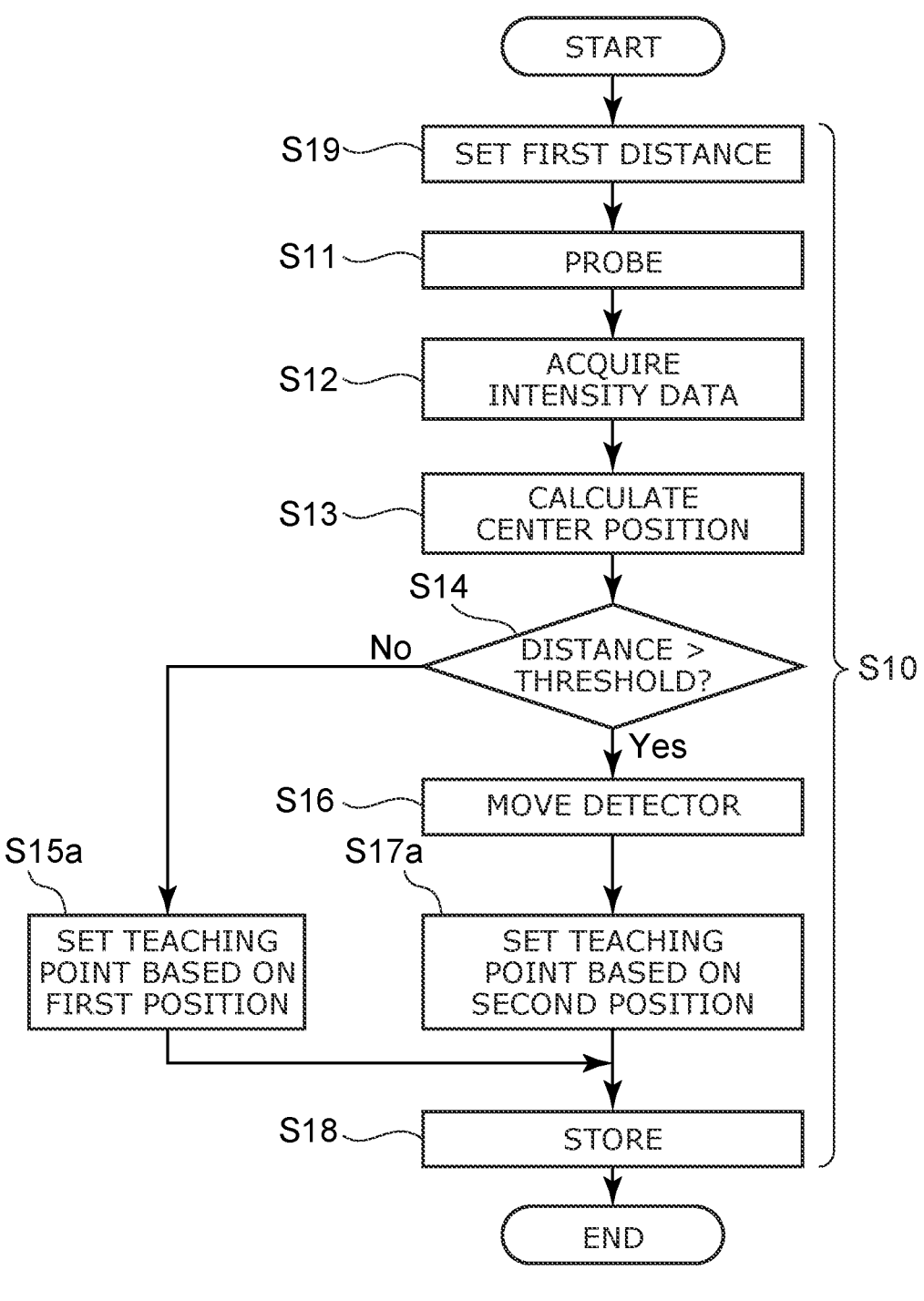
FIG. 12 is a flowchart showing a teaching method according to a second modification of the embodiment.
Figure 13A:
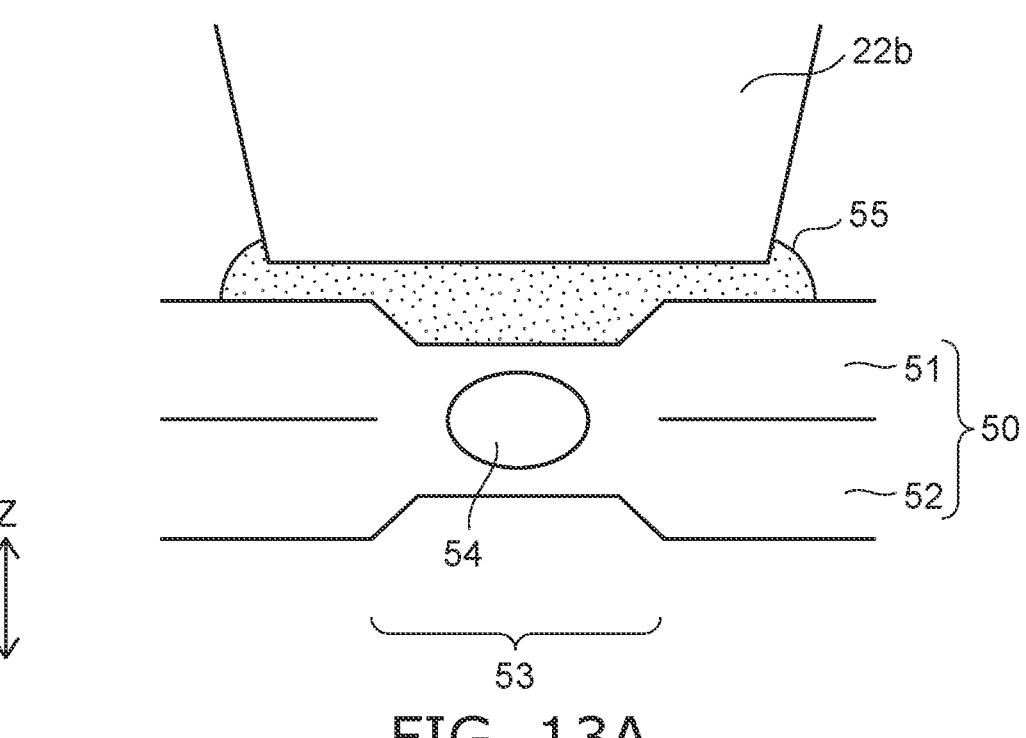
FIGS. 13A and 13B are schematic views for describing the teaching method according to the second modification of the embodiment.
Figure 13B:
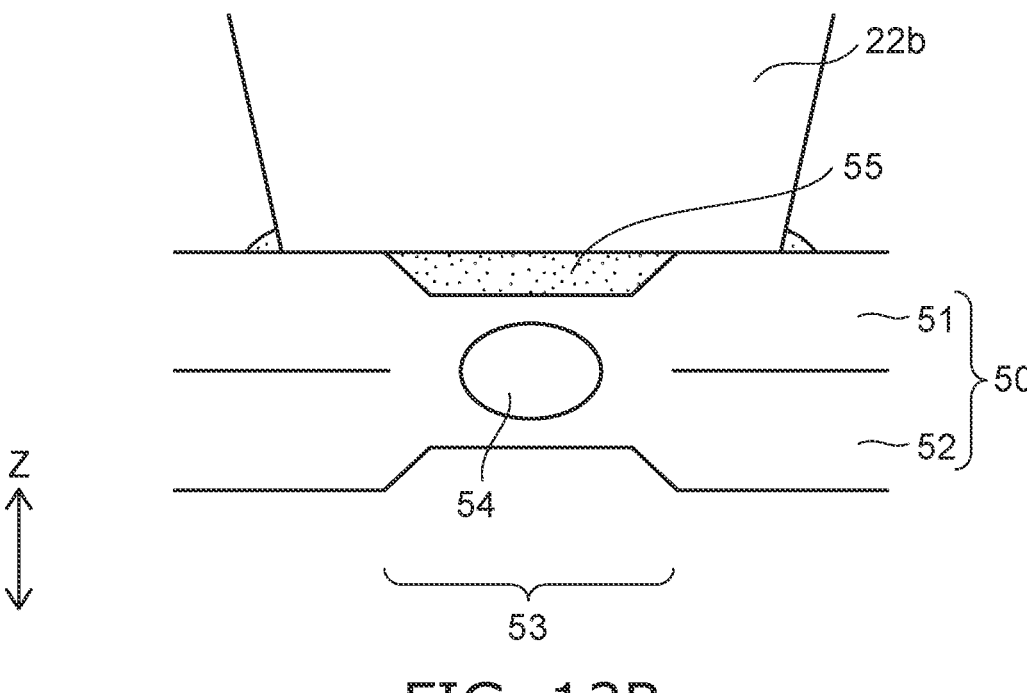

FIG. 12 is a flowchart showing a teaching method according to a second modification of the embodiment. FIGS. 13A and 13B are schematic views for describing the teaching method according to the second modification of the embodiment.

Compared to the teaching method shown in FIG. 5, the teaching method according to the second modification includes step S19 instead of step S1. Also, the teaching method according to the second modification includes steps S15a and S17a instead of steps S15 and S17.

In step S19, the processing system 1 sets the distance in the Z-direction between the detector 22 and the weld portion 53 to a first distance. The first distance is greater than a second distance in the Z-direction between the detector 22 and the weld portion 53 when the inspection processing is performed. At this time, as shown in FIG. 13A, the detector 22 contacts the joined body 50 via the couplant liquid 55. The detector 22 does not directly contact the joined body 50.

Subsequently, similarly to the teaching method shown in FIG. 5, the processing system 1 performs steps S11 to S14. In step S15a, the processing system 1 sets the teaching point based on the first position. At this time, the control device 10 sets the distance in the Z-direction between the detector 22 and the weld portion 53 to the second distance. Thereby, the detector 22 approaches the weld portion 53. For example, as shown in FIG. 13B, the detector 22 directly contacts the joined body 50. The processing system 1 sets the teaching point based on the first position in the X-Y plane and the Z-direction position of the detector 22 after the approach of the detector 22.

Similarly, in step S17a, the processing system 1 sets the teaching point based on the second position. At this time, the control device 10 sets the distance in the Z-direction between the detector 22 and the weld portion 53 to the second distance. The processing system 1 sets the teaching point based on the second position in the X-Y plane and the Z-direction position of the detector 22 after approaching.

The first distance can be set by causing the detector 22 to approach the joined body 50 while performing the probe. When the detector 22 is separated from the joined body 50 and the couplant liquid 55, the ultrasonic wave is attenuated, and the reflected wave is not detected. When the detector 22 contacts the couplant liquid 55, the ultrasonic wave propagates through the couplant liquid 55; and the reflected wave is detected. The control device 10 causes the detector 22 to gradually approach the joined body 50, and stops the detector 22 at the timing at which a reflected wave is detected. Thereby, the distance between the detector 22 and the joined body 50 is set to the first distance.

Or, the first distance may be set by moving the detector 22 slightly away from the joined body 50 after causing the detector 22 to contact the joined body 50. The control device 10 causes the detector 22 to approach the joined body 50 until contact of the detector 22 with the joined body 50 is detected by the sensor 22d. After the contact is detected, the control device 10 moves the detector 22 slightly away from the joined body 50. The distance to be moved away is preset. Thereby, the distance between the detector 22 and the joined body 50 is set to the first distance.

After contact is detected, the detector 22 may be gradually moved away from the joined body 50 while probing. The control device 10 gradually moves the detector 22 away from the joined body 50 while the reflected wave is detected. When the reflected wave is no longer detected, the control device 10 moves the detector 22 to the Z-direction position at which the reflected wave was lastly detected. Thereby, the distance between the detector 22 and the joined body 50 is set to the first distance.

When performing step S16, the distance in the Z-direction between the detector 22 and the weld portion 53 is set to the first distance. In other words, when performing step S16, the control device 10 moves the detector 22 along the X-Y plane without moving the detector 22 away from the weld portion 53. At this time, the detector 22 contacts the joined body 50 via the couplant liquid. Therefore, the friction between the detector 22 and the joined body 50 when moving the detector 22 can be reduced. Also, the time necessary for performing the teaching method can be reduced because the operation of moving the detector 22 away from the weld portion 53 is unnecessary.

In the teaching method according to the second modification, the orientation teaching processing also may be performed similarly to the first modification. As described above, it is favorable for the orientation teaching processing to be performed after the position teaching processing.

Figure 14:
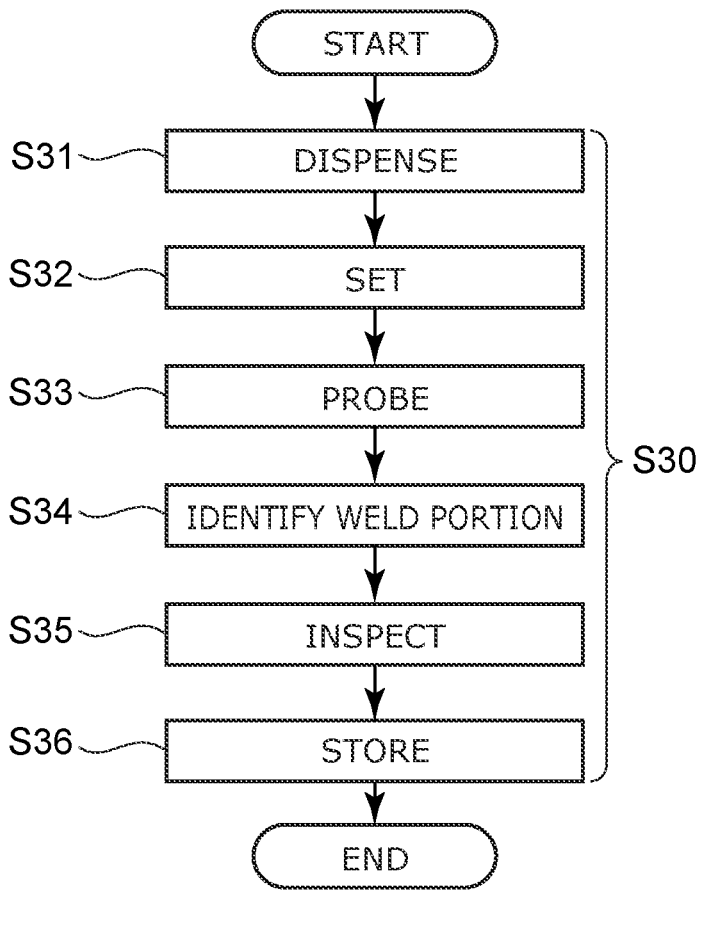
FIG. 14 is a flowchart showing inspection processing according to the embodiment.

FIG. 14 is a flowchart showing inspection processing according to the embodiment.

When the teaching point has been set by any of the teaching methods described above, the robot system 2 performs inspection processing (step S30). The control device 10 dispenses the couplant liquid 55 from the dispenser 25 toward the joined body 50 (step S31). The control device 10 operates the manipulator 21 and sets the position and orientation of the detector 22 to the position and orientation of the teaching point (step S32). The control device 10 causes the detector 22 to perform a probe of the weld portion 53 (step S33). The processing device 12 identifies the weld portion 53 based on the obtained intensity data (third intensity data) (step S34). The processing device 12 inspects the weld portion 53 (step S35). In the inspection, for example, the diameter of the weld portion 53 is compared to a threshold. The processing device 12 stores the inspection result (step S36).

According to the processing method that includes the teaching method and the inspection processing, the center position of the weld portion 53 can be more easily set as the teaching point; and the weld portion 53 can be inspected using the teaching point that is set.

Figure 15:
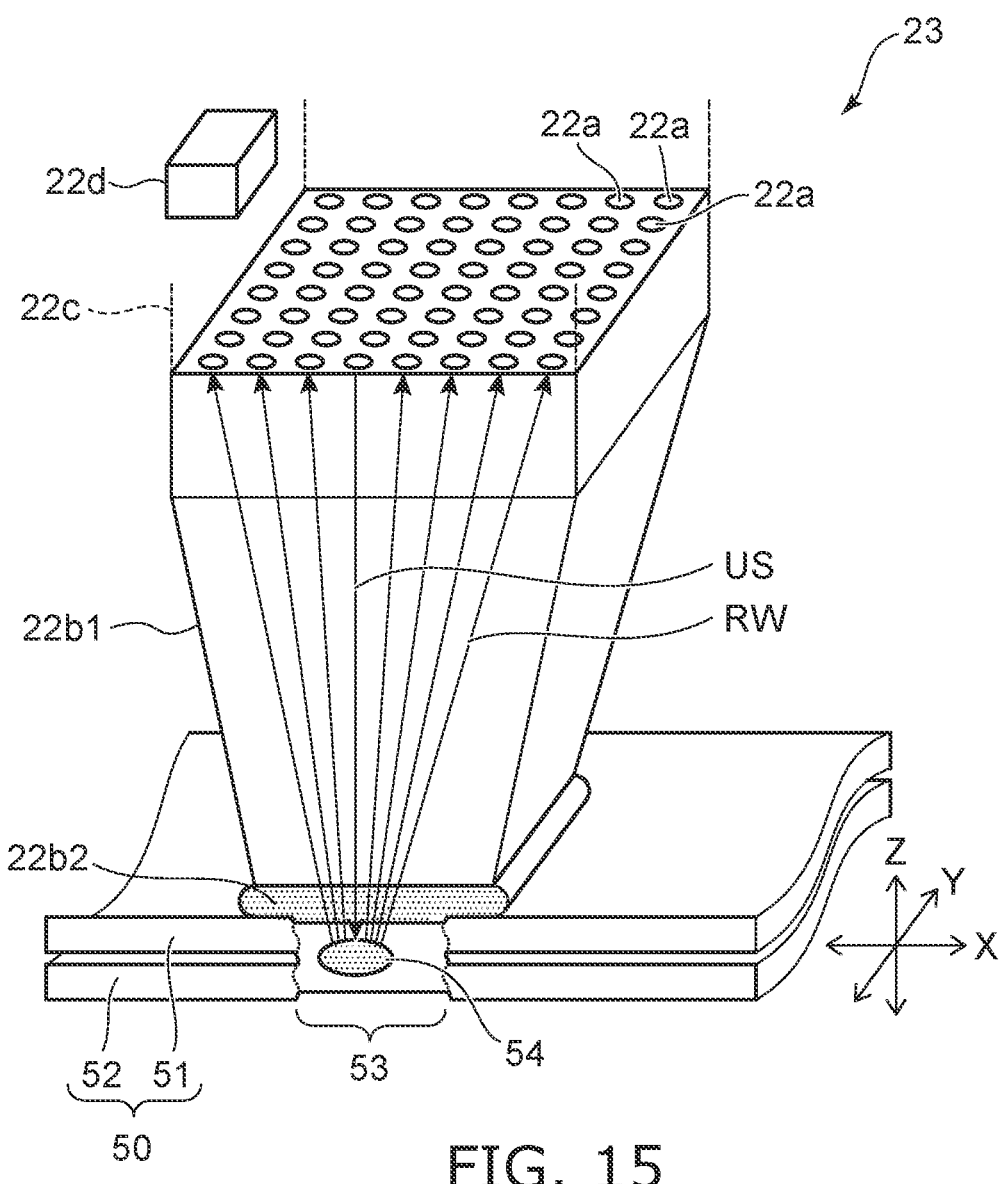
FIG. 15 is a schematic view showing the structure of another detector.

FIG. 15 is a schematic view showing the structure of another detector.

In an example described above, the couplant liquid 55 is used when performing the probe. The couplant liquid 55 is omissible if a propagating member that is deformable according to the shape of the weld portion 53 is included in the detector.

The detector 23 shown in FIG. 15 includes a first propagating member 22b1 and a second propagating member 22b2. The first propagating member 22b1 is mounted to the housing 22c of the detector 23. The ultrasonic wave can propagate through the first propagating member 22b1. For example, the first propagating member 22b1 contacts the multiple detection elements 22a. Or, another member capable of propagating the ultrasonic wave may be located between the first propagating member 22b1 and the multiple detection elements 22a.

The second propagating member 22b2 is mounted to the first propagating member 22b1. The second propagating member 22b2 may be bonded to the first propagating member 22b1 or may be fixed with respect to the first propagating member 22b1 by a not-illustrated fixture. The first propagating member 22b1 is positioned between the second propagating member 22b2 and the multiple detection elements 22a. The second propagating member 22b2 can propagate the ultrasonic wave. The ultrasonic wave that propagates through the first propagating member 22b1 propagates through the second propagating member 22b2 and is transmitted outside the detector 23.

The first propagating member 22b1 is a solid. The first propagating member 22b1 has a sufficient hardness so that substantial modification does not occur even when operating the detector 22. The second propagating member 22b2 is a gel but is not a liquid. The second propagating member 22b2 is softer than the first propagating member 22b1. In other words, the hardness of the second propagating member 22b2 is less than the hardness of the first propagating member 22b1. Therefore, the second propagating member 22b2 deforms easily compared to the first propagating member 22b1. The first propagating member 22b1 has sufficient softness so that the first propagating member 22b1 can deform according to the surface configuration of the object of the inspection when probing.

The first propagating member 22b1 and the second propagating member 22b2 include resins. As one specific example, the first propagating member 22b1 includes acrylic. The second propagating member 22b2 includes segmented polyurethane. The acoustic impedance of a general steel plate used in joining is about $4.5 \times 10^7$ (Pa·s/m). It is favorable for the acoustic impedances of the first and second propagating members 22b1 and 22b2 each to be greater than $1.0 \times 10^5$ (Pa·s/m) and less than $1.0 \times 10^8$ (Pa·s/m) so that the ultrasonic wave sufficiently propagates between the detector 22 and the joined body 50. The acoustic impedance can be measured in accordance with JIS A 1405-1 (ISO 10534-1).

The processing system 1 may perform the teaching method described above for the robot 20 that includes the detector 23 instead of the detector 22. However, it is favorable for the control device 10 to move the detector 23 away from the joined body 50 when moving the detector 23 along the X-Y plane in step S16 of any of the teaching methods. Because the second propagating member 22b2 is a gel, the friction between the second propagating member 22b2 and the joined body 50 is large. The second propagating member 22b2 may be damaged when the detector 22 is moved in a state in which the second propagating member 22b2 contacts the joined body 50. By moving the detector 23 along the X-Y plane after moving the detector 23 away from the joined body 50, the damage of the second propagating member 22b2 can be suppressed.

Figure 16:
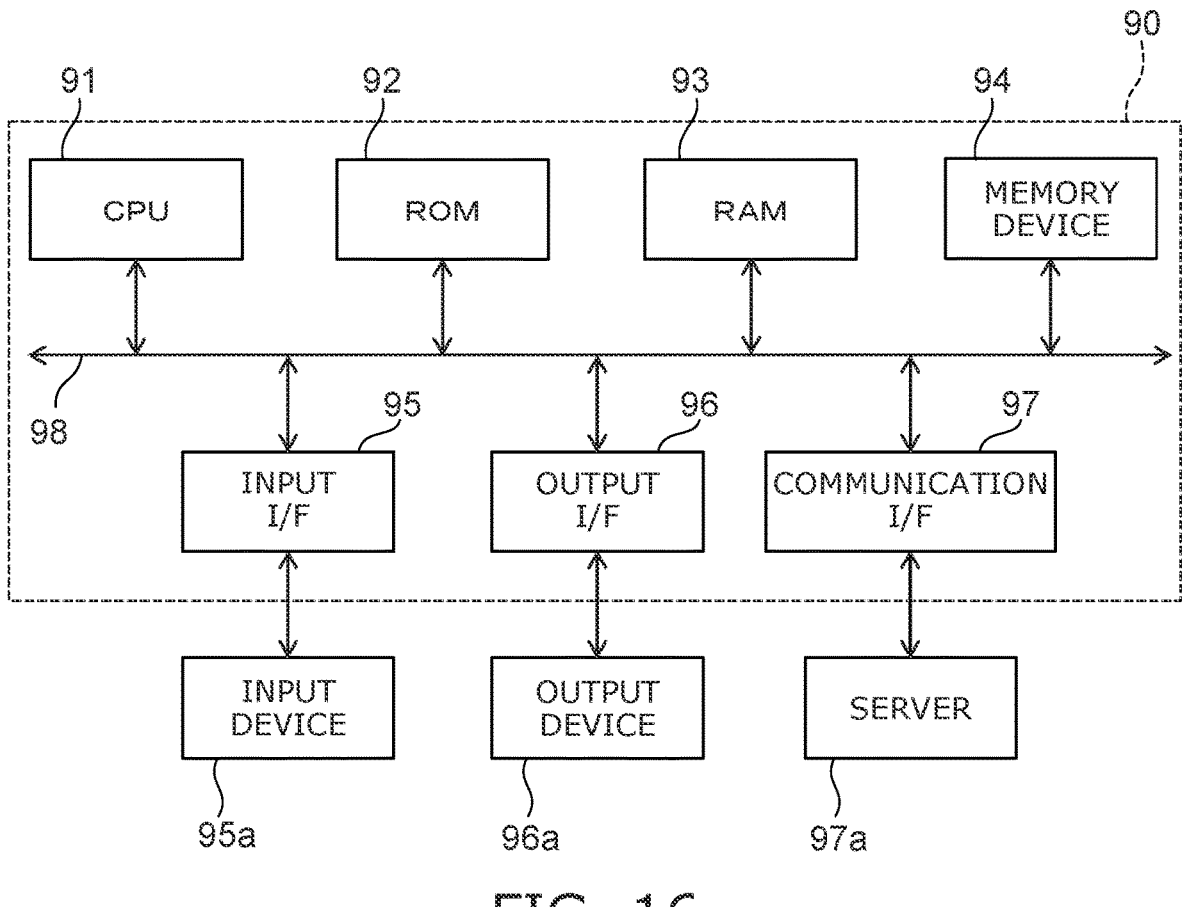
FIG. 16 is a schematic view showing a hardware configuration.

FIG. 16 is a schematic view showing a hardware configuration.

The control device 10, the operation terminal 11, and the processing device 12 each include, for example, the configuration of a computer 90 shown in FIG. 16. The computer 90 includes a CPU 91, ROM 92, RAM 93, a memory device 94, an input interface 95, an output interface 96, and a communication interface 97.

The ROM 92 stores programs that control the operations of the computer 90. Programs that are necessary for causing the computer 90 to realize the processing described above are stored in the ROM 92. The RAM 93 functions as a memory region into which the programs stored in the ROM 92 are loaded.

The CPU 91 includes a processing circuit. The CPU 91 uses the RAM 93 as work memory to execute the programs stored in at least one of the ROM 92 or the memory device 94. When executing the programs, the CPU 91 executes various processing by controlling configurations via a system bus 98.

The memory device 94 stores data necessary for executing the programs and/or data obtained by executing the programs.

The input interface (I/F) 95 connects the computer 90 and an input device 95*a*. The input I/F 95 is, for example, a serial bus interface such as USB, etc. The CPU 91 can read various data from the input device 95*a* via the input I/F 95.

The output interface (I/F) 96 connects the computer 90 and an output device 96*a*. The output I/F 96 is, for example, an image output interface such as Digital Visual Interface (DVI), High-Definition Multimedia Interface (HDMI (registered trademark)), etc. The CPU 91 can transmit data to the output device 96*a* via the output I/F 96 and cause the output device 96*a* to display an image.

The communication interface (I/F) 97 connects the computer 90 and a server 97*a* that is outside the computer 90. The communication I/F 97 is, for example, a network card such as a LAN card, etc. The CPU 91 can read various data from the server 97*a* via the communication I/F 97.

The memory device 94 includes at least one selected from a hard disk drive (HDD) and a solid state drive (SSD). The input device 95*a* includes at least one selected from a mouse, a keyboard, a microphone (audio input), and a touchpad. The output device 96*a* includes at least one selected from a monitor and a projector. A device such as a touch panel that functions as both the input device 95*a* and the output device 96*a* may be used.

The functions of the control device 10 and the processing device 12 may be realized by the collaboration of three or more computers. The functions of the control device 10 and the processing device 12 may be realized by one computer. The major parts of the various processing described above are modifiable as appropriate between the control device 10 and the processing device 12.

The processing of the various data described above may be recorded, as a program that can be executed by a computer, in a magnetic disk (a flexible disk, a hard disk, etc.), an optical disk (CD-ROM, CD-R, CD-RW, DVD-ROM, DVD±R, DVD±RW, etc.), semiconductor memory, or another non-transitory computer-readable storage medium.

For example, the information that is recorded in the recording medium can be read by a computer (or an embedded system). The recording format (the storage format) of the recording medium is arbitrary. For example, the computer reads the program from the recording medium and causes the CPU to execute the instructions recited in the program based on the program. In the computer, the acquisition (or the reading) of the program may be performed via a network.

According to the processing system, the robot system, the control device, the teaching method, or the processing method described above, the center position of the weld portion can be more easily set as the teaching point. The center position of the weld portion can be more easily set as the teaching point by using a program to cause a computer to perform the teaching method or the processing method.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention. The above embodiments can be practiced in combination with each other.

16

What is claimed is:

1. A processing system,
the processing system teaching an operation to a robot,
the robot including:
    a detector including a plurality of detection elements arranged along a first direction and a second direction, the second direction crossing the first direction; and
    a manipulator to which the detector is mounted,
the processing system teaching the operation to the robot by performing position teaching processing,
the position teaching processing including:
    causing the detector to perform a probe of a weld portion of a joined body, the probe including a transmission of an ultrasonic wave and a detection of a reflected wave;
    calculating a center position of the weld portion in a first plane based on first intensity data of an intensity of the reflected wave obtained by the probe, the first plane being along the first and second directions;
    setting a teaching point of the robot based on a first position of the detector in the first plane when a distance between the center position and the first position is not more than a first threshold; and
    when the distance is greater than the first threshold, moving the detector along the first plane to a second position to reduce the distance after moving the detector away from the weld portion, and setting the teaching point based on the second position, the distance between the center position and the second position being shorter than the distance between the center position and the first position,
the processing system performing inspection processing after the position teaching processing,
in the inspection processing, a plurality of other joined bodies of the same type as the joined body being inspected using the teaching point,
the processing system performing orientation teaching processing after the position teaching processing,
the orientation teaching processing including:
    causing the detector to perform the probe of the weld portion;
    calculating a tilt with respect to the weld portion of the detector in a first orientation based on second intensity data of an intensity of the reflected wave obtained by the probe;
    setting the teaching point based on the first orientation when the tilt is not more than a second threshold; and
    when the tilt is greater than the second threshold, moving the detector to a second orientation to reduce the tilt, and setting the teaching point based on the second orientation, the tilt with respect to the weld portion of the detector in the second orientation being less than the tilt with respect to the weld portion of the detector in the first orientation.

2. The processing system according to claim 1, wherein the position teaching processing includes:
    causing the detector to detect the reflected wave in a state in which the detector contacts the joined body via a liquid; and
    when setting the teaching point, causing the detector to approach the weld portion along a third direction perpendicular to the first plane, and setting the teaching point based on a position in the third direction after approaching one of the first position or the second position.

3. The processing system according to claim 1, wherein, in the inspection processing, a position of the detector is set to a position of the teaching point, the detector is caused to perform the probe of a weld portion of one of the plurality of joined body, and the weld portion is inspected based on third intensity data of an intensity of the reflected wave obtained by the probe.

4. The processing system according to claim 1, wherein a centroid position of an intensity in the first intensity data is calculated as the center position.

5. A robot system, comprising:

the processing system according to claim 1; and the robot.

6. The processing system according to claim 1, wherein when the position teaching processing is performed, the manipulator is moved to a position adjacent to the weld portion, and then the detector is caused to perform the probe.

7. A control device, comprising:

processing circuitry configured to:

cause a robot to perform a probe of a weld portion of a joined body, the probe including a transmission of an ultrasonic wave and a detection of a reflected wave, a result of the probe including first intensity data of an intensity of the reflected wave, the robot including a detector and a manipulator, the detector being mounted to the manipulator;

set a teaching point of the robot based on a first position of the detector when a distance in a first plane between a center position of the weld portion and the first position is not more than a first threshold, the first plane being along two-dimensional arrangement directions of a plurality of detection elements included in the detector;

when the distance is greater than the first threshold, move the detector along the first plane to a second position after moving the detector away from the weld portion, and set the teaching point based on the second position, the distance between the center position and the second position being shorter than the distance between the center position and the first position;

perform an inspection processing after setting the teaching point, in the inspection processing, a plurality of other joined bodies of the same type as the joined body is inspected using the teaching point; and perform orientation teaching processing after the position teaching processing, the orientation teaching processing including:

causing the detector to perform the probe of the weld portion;

calculating a tilt with respect to the weld portion of the detector in a first orientation based on second intensity data of an intensity of the reflected wave obtained by the probe;

setting the teaching point based on the first orientation when the tilt is not more than a second threshold; and when the tilt is greater than the second threshold, moving the detector to a second orientation to reduce the tilt, and setting the teaching point based on the second orientation, the tilt with respect to the weld portion of the detector in the second orientation being less than the tilt with respect to the weld portion of the detector in the first orientation.

8. The control device according to claim 7, wherein before setting the teaching point, the processing circuitry is further configured to move the manipulator to a first position.

9. A teaching method, the teaching method teaching an operation to a robot, the robot including a detector including a plurality of detection elements arranged along a first direction and a second direction, the second direction crossing the first direction, and a manipulator to which the detector is mounted, the teaching method comprising teaching the operation to the robot by a position teaching, the position teaching including:

causing the detector to perform a probe of a weld portion of a joined body, the probe including a transmission of an ultrasonic wave and a detection of a reflected wave;

calculating a center position of the weld portion in a first plane based on first intensity data of an intensity of the reflected wave obtained by the probe, the first plane being along the first and second directions;

setting a teaching point of the robot based on a first position of the detector in the first plane when a distance between the center position and the first position is not more than a first threshold; and when the distance is greater than the first threshold, moving the detector along the first plane to a second position to reduce the distance after moving the detector away from the weld portion, and setting the teaching point based on the second position, the distance between the center position and the second position being shorter than the distance between the center position and the first position, the teaching method further comprising inspection processing after the position teaching processing, in the inspection processing, a plurality of other joined bodies of the same type as the joined body being inspected using the teaching point, the teaching method further comprising orientation teaching processing after the position teaching, the orientation teaching processing including:

causing the detector to perform the probe of the weld portion;

calculating a tilt with respect to the weld portion of the detector in a first orientation based on second intensity data of an intensity of the reflected wave obtained by the probe;

setting the teaching point based on the first orientation when the tilt is not more than a second threshold; and when the tilt is greater than the second threshold, moving the detector to a second orientation to reduce the tilt, and setting the teaching point based on the second orientation, the tilt with respect to the weld portion of the detector in the second orientation being less than the tilt with respect to the weld portion of the detector in the first orientation.

10. The teaching method according to claim 9, wherein the position teaching includes:

causing the detector to detect the reflected wave in a state in which the detector contacts the weld portion via a liquid; and when setting the teaching point, causing the detector to approach the weld portion along a third direction perpendicular to the first plane, and setting the teaching point based on a position in the third direction after approaching one of the first position or the second position.

11. The teaching method according to claim 9, wherein a centroid position of an intensity in the first intensity data is calculated as the center position.

12. A non-transitory computer-readable storage medium storing a program, the program causing a computer to execute the teaching method according to claim 9.

13. The teaching method according to claim 9, wherein when the position teaching processing is performed, the manipulator is moved to a position adjacent to the weld portion, and then the detector is caused to perform the probe.

14. A teaching method, comprising:

causing a robot to perform a probe of a weld portion of a joined body, the probe including a transmission of an ultrasonic wave and a detection of a reflected wave, a result of the probe including first intensity data of an intensity of the reflected wave, the robot including a detector and a manipulator, the detector being mounted to the manipulator;

setting a teaching point of the robot based on a first position of the detector when a distance in a first plane between a center position of the weld portion and the first position is not more than a first threshold, the first plane being along two-dimensional arrangement directions of a plurality of detection elements included in the detector, the center position being calculated from a result of the probe; and when the distance is greater than the first threshold, moving the detector along the first plane to a second position to reduce the distance after moving the detector away from the weld portion, and setting the teaching point based on the second position, the distance between the center position and the second position being shorter than the distance between the center position and the first position, the teaching method further comprising an inspection processing after setting the teaching point, in the inspection processing, a plurality of other joined bodies of the same type as the joined body is inspected, the teaching method further comprising orientation teaching processing, the orientation teaching processing including:

causing the detector to perform the probe of the weld portion;

calculating a tilt with respect to the weld portion of the detector in a first orientation based on second intensity data of an intensity of the reflected wave obtained by the probe;

setting the teaching point based on the first orientation when the tilt is not more than a second threshold; and when the tilt is greater than the second threshold, moving the detector to a second orientation to reduce the tilt, and setting the teaching point based on the second orientation, the tilt with respect to the weld portion of the detector in the second orientation being less than the tilt with respect to the weld portion of the detector in the first orientation.

15. The teaching method according to claim 14, wherein before setting the teaching point, the manipulator is moved to a first position.

* * * * *